United States Patent
Michiels et al.

(10) Patent No.: US 10,769,310 B2
(45) Date of Patent: Sep. 8, 2020

(54) METHOD FOR MAKING A MACHINE LEARNING MODEL MORE DIFFICULT TO COPY

(71) Applicant: NXP B.V., Eindhoven (NL)

(72) Inventors: Wilhelmus Petrus Adrianus Johannus Michiels, Reusel (NL); Gerardus Antonius Franciscus Derks, Dongen (NL)

(73) Assignee: NXP B.V., Eindhoven (NL)

( * ) Notice: Subject to any disclaimer, the term of this patent is extended or adjusted under 35 U.S.C. 154(b) by 137 days.

(21) Appl. No.: 16/040,992

(22) Filed: Jul. 20, 2018

(65) Prior Publication Data

US 2020/0026885 A1 Jan. 23, 2020

(51) Int. Cl.

| | |
|---|---|
| *H04L 29/06* | (2006.01) |
| *G06F 21/76* | (2013.01) |
| *G06F 21/75* | (2013.01) |
| *G06N 3/04* | (2006.01) |
| *G06N 3/063* | (2006.01) |
| *G06N 3/08* | (2006.01) |

(52) U.S. Cl.
CPC .............. *G06F 21/76* (2013.01); *G06F 21/75* (2013.01); *G06N 3/0481* (2013.01); *G06N 3/063* (2013.01); *G06N 3/084* (2013.01)

(58) Field of Classification Search
CPC ....... G06F 21/75; G06F 21/76; G06N 3/0481; G06N 3/08; G06N 5/00; G06N 5/022; G06N 7/00; G06N 20/00
See application file for complete search history.

(56) References Cited

U.S. PATENT DOCUMENTS

| 7,644,051 | B1 * | 1/2010 | Moore ................. | G05B 13/027 |
| | | | | 706/21 |
| 10,242,423 | B2 * | 3/2019 | Ould-Ahmed-Vall | ....................... |
| | | | | G06F 9/5044 |

(Continued)

OTHER PUBLICATIONS

Rouhani et al., "DeepSigns: A Generic Watermarking Framework for Protecting the Ownership of Deep Learning Models", Apr. 3, 2018, pp. 1-13, arxiv.org, Cornell University Library, Ithaca, NY, USA.

(Continued)

*Primary Examiner* — Hosuk Song

(74) *Attorney, Agent, or Firm* — Daniel D. Hill

(57) ABSTRACT

A method for protecting a machine learning model from copying is provided. The method includes providing a neural network architecture having an input layer, a plurality of hidden layers, and an output layer. Each of the plurality of hidden layers has a plurality of nodes. A neural network application is provided to run on the neural network architecture. First and second types of activation functions are provided. Activation functions including a combination of the first and second types of activation functions are provided to the plurality of nodes of the plurality of hidden layers. The neural network application is trained with a training set to generate a machine learning model. Using the combination of first and second types of activation functions makes it more difficult for an attacker to copy the machine learning model. Also, the neural network application may be implemented in hardware to prevent easy illegitimate upgrading of the neural network application.

22 Claims, 5 Drawing Sheets

AF1

$\tanh(x) = \frac{e^x - e^{-x}}{e^x + e^{-x}}$

AF2

$\sigma(x) = \frac{1}{1 + e^{-x}}$

AF3

$\text{ReLU}(x) = \begin{cases} 0 & \text{FOR } x < 0 \\ x & \text{FOR } x \geq 0 \end{cases}$

AF4

$\text{STEP}(x) = \begin{cases} 0 & \text{FOR } x < 0 \\ 1 & \text{FOR } x \geq 0 \end{cases}$

AF5

$\text{GAUSSIAN}(x) = e^{-x^2}$

(56) References Cited

U.S. PATENT DOCUMENTS

| | | | |
|---|---|---|---|
| 10,303,953 B2* | 5/2019 | Varerkar | G06N 3/0445 |
| 10,346,944 B2* | 7/2019 | Nurvitadhi | G06F 12/0888 |
| 10,353,706 B2* | 7/2019 | Kaul | G06F 7/5443 |
| 10,572,773 B2* | 2/2020 | Yehezkel Rohekar | G06K 9/6269 |
| 2020/0104673 A1 | 4/2020 | Michiels et al. | |

OTHER PUBLICATIONS

Shirakawa et al., "Dynamic Optimization of Neural Network Structures Using Probabilistic Modeling", Jan. 23, 2018, pp. 1-9, arxiv.org, Cornell University Library, Ithaca, NY, USA.

Harmon, Mark, et al.; "Activiation Ensembles for Deep Neural Networks;" Feb. 24, 2017 in arXiv; From the Internet: https://arxiv.org/abs/1702.07790.

Theano Development Team: Al-Rfou, Rami, et al.; "Theano: A Python Framework for Fast Computation of Mathematical Expressions;" May 9, 2016 in arXiv; From the Internet: https://arxiv.org/abs/1605.02688.

Tramer, Florian, et al.; "Stealing Machine Learning Models via Prediction APIs;" Proceedings of the 25th USENIX Security Symposium; Aug. 10-12, 2016, Austin, Texas; ISBN978-1-931971-32-4.

Binev, Peter, et al.; "Universal Algorithms for Learning Theory Part I: Piecewise Constant Functions;" Jouirnal of Machine Learning Research 6; Published Sep. 2005; pp. 1297-1321.

Binev, Peter, et al.; "Universal Piecewise Polynomial Estimators for Machine Learning;" Dec. 13, 2006; Research supported by Office of Naval Research Contracts, AFOSR Contract, DARPA/NGA Contract; ARO/DoD Contract, National Science Foundation Grant, French-German PROSCOPE Contract, and Leibniz Programme of the DFG.

Eto, Riki et al.; "Fully-Automatic Bayesian Piecewise Sparse Linear Models," 17th International Conference on Artificial Intelligence and Statistics (AISTATS); Reykjavik, Iceland; Apr. 22 - 25, 2014.

Wang, Yi, et al.; "Inference-Based Similarity Search in Randomized Montgomery Domains for Privacy-Preserving Biometric Identification;" IEEE Transactions on Pattern Analysis and Machine Intelligence (vol. 40, Issue: 7, Jul. 1 2018); pp. 1611-1624; DOI: 10.1109/TPAM1.2017.2727048.

* cited by examiner

METHOD FOR MAKING A MACHINE LEARNING MODEL MORE DIFFICULT TO COPY

BACKGROUND

Field

This disclosure relates generally to machine learning, and more particularly, to a method for making a machine learning model more difficult to copy.

Related Art

Machine learning functionality is becoming more widely used in many of today's applications. Machine learning algorithms may be classified by how they are trained. Supervised learning, unsupervised learning, semi-supervised learning, and reinforcement learning are examples of training techniques. Training data is used for training the machine learning algorithm. A machine learning model is what is learned from training with the training data, and contains a parameter set for the machine learning algorithm. A neural network may be used in machine learning. Neural networks are used in the areas of supervised learning and reinforcement learning. The effectiveness of a machine learning algorithm is influenced by its accuracy, execution time, storage requirements, and the quality of the training data. The expertise and expense required for compiling a representative training set and labelling the data results in the training data and model obtained from the training data are valuable assets. Once an attacker has access, the machine learning model can be relatively easily copied. Black box access to the model may not provide sufficient protection. Also, a black box may not always be available to protect the model. Once an attacker has copied the model, it can be illegitimately monetized.

Therefore, a need exists for a method to better protect a machine learning model from being easily copied.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
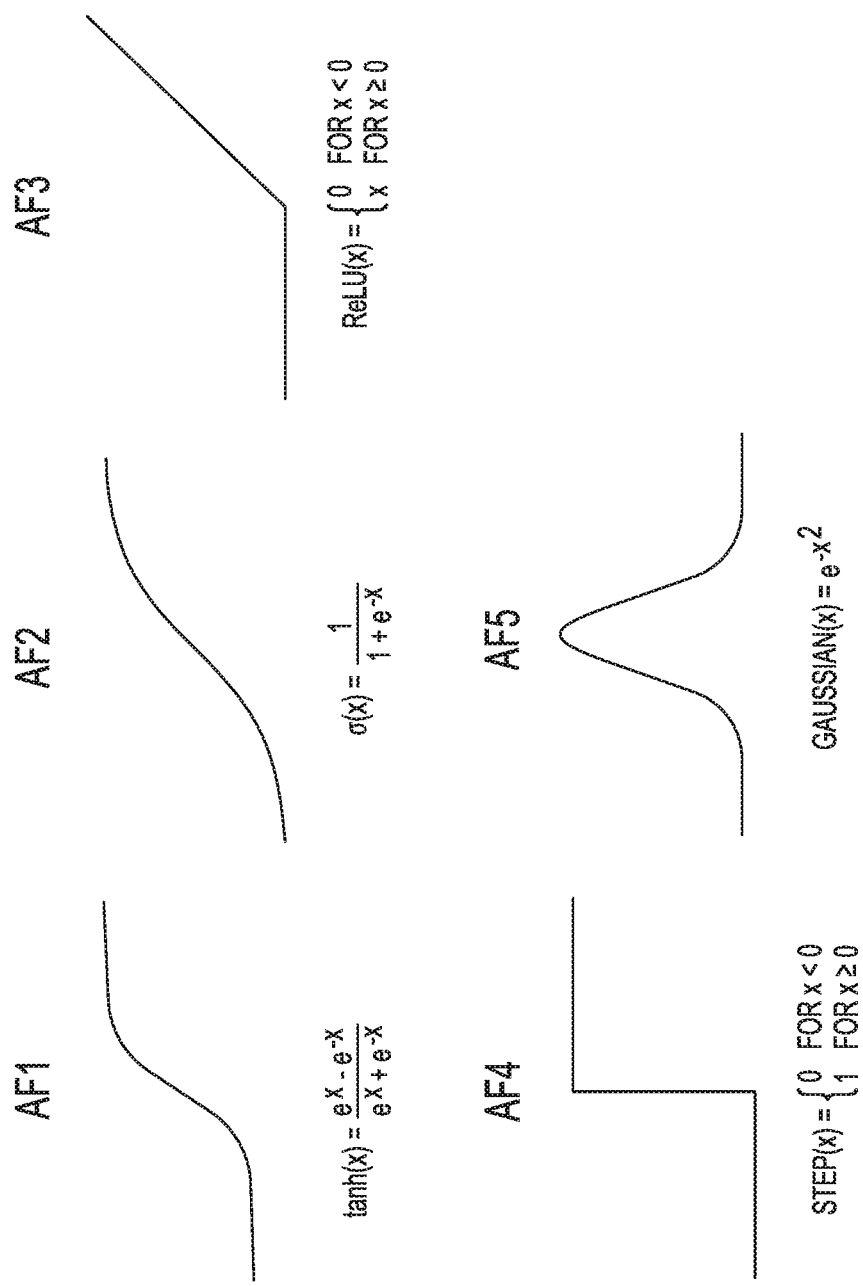
FIG. 1 illustrates a plurality of type 1 activation functions.

Generally, there is provided, a method for making a machine learning model more difficult to copy. This is accomplished by using a hybrid combination of activation functions for the hidden nodes of a neural network architecture. That is, each hidden node includes at least one of one type of activation function and at least one of another type of activation function. The types of activation functions for each node may be chosen at random and independently of the activation function choices made for the other nodes. The assignment of activation functions may be unknown to an adversary. In one embodiment, a neural network application running on the neural network architecture is implemented in hardware in a hardware secure element. The use of a hybrid combination of activation functions provides better resistance to a cloning attack by reducing the accuracy of the copied model so that the copy will provide a different answer when queried. The use of a hardware secure element makes a device more difficult to illegitimately upgrade with a copy of better machine learning model.

In accordance with an embodiment, there is provided, a method including: providing a neural network architecture having an input layer, a plurality of hidden layers, and an output layer, each of the plurality of hidden layers having a plurality of nodes; providing a neural network application to run on the neural network architecture; providing a first type of activation functions; providing a second type of activation functions; assigning a combination of the activation functions of the first and second types to the plurality of nodes; and training the neural network application with a training set to generate a machine learning model. The neural network application may be implemented in a secure hardware element on an integrated circuit. The integrated circuit may be characterized as being a field programmable gate array. The method may further include providing a different neural network architecture for implementation in each of a plurality of machine learning devices, wherein the different neural network architectures may differ in the plurality of machine learning devices by changing a ratio of the combination of the first and second types of activation functions in the plurality of hidden layers. The activation function of the first type may include functions providing a plot having at most one increasing slope segment and/or at most one decreasing slope segment. The activation function of the second type may include functions providing a plot having at least two increasing slope segments and/or at least two decreasing slope segments. Assigning a combination of the activation functions may further include randomly assigning the mix of the activation functions. The combination of activation functions may be implemented in a secure hardware element in the integrated circuit with the neural network application and wherein the neural network application may not be changeable. The assigning the combination of activation functions may further include the first and second types of the activation functions being assigned from a set of activation functions comprising tanh(x), rectified linear unit ReLU(x), step(x), Gaussian(x), sigmoid(x) sin(x), and sinc (x), wherein x is an input to a node of the plurality of nodes. Assigning a combination of the activation functions of the first and second types to the plurality of nodes may further include assigning a sine function as one of the activation functions of the first or the second types, and wherein fewer than fifty percent of the plurality of nodes comprises the sine function. The activation function of the second type may be a sinusoid, and the activation function of the first type may be a monotone.

In another embodiment, there is provided, a method for protecting a machine learning model from copying, the method including; providing a neural network architecture having an input layer, a plurality of hidden layers, and an output layer, each of the plurality of hidden layers having a plurality of nodes; providing a neural network application to run on the neural network architecture; providing a first type of activation function; providing a second type of activation function; randomly assigning a combination of the activation functions of the first and second types to the plurality of nodes; and training the neural network application with a training set to generate a machine learning model, wherein the combination of the first and second types of the activation functions causes the machine learning model to be more difficult to copy. The neural network application may be implemented in a secure hardware element on an integrated circuit. The integrated circuit may be characterized as being a field programmable gate array. The method may further include providing a different neural network architecture for implementation in each of a plurality of machine learning devices, wherein the different neural network architectures may differ in the plurality of machine learning devices by changing a ratio of the mix of the first and second types of activation functions in the plurality of hidden layers. Assigning a combination of the activation functions may further include randomly assigning the mix of the activation functions. The combination of activation functions may be implemented in a secure hardware element in the integrated circuit with the neural network application and wherein the neural network application may not be changeable. The assigning of the combination of activation functions may further include the first and second types of the activation functions being assigned from a set of activation functions including tanh(x), rectified linear unit ReLU(x), step(x), Gaussian(x), sin(x), and sinc(x), wherein x is an input to a node of the plurality of nodes.

In yet another embodiment, there is provided, a method for protecting a machine learning model from copying, the method including: providing a neural network architecture having an input layer, a plurality of hidden layers, and an output layer, each of the plurality of hidden layers having a plurality of nodes; providing a neural network application to run on the neural network architecture, the neural network application implemented in a secure hardware element of an integrated circuit; providing a first type of activation function comprising activation functions that are plotted with no more than one increasing slope segment or no more than one decreasing slope segment; providing a second type of activation function comprising activation functions that are plotted with at least two increasing slope segments and at least two decreasing slope segments; assigning a combination of the activation functions of the first and second types to the plurality of nodes; and training the neural network application with a training set to generate a machine learning model, wherein the mix of the first and second types of the activation functions cause the machine learning model to be more difficult to copy. The integrated circuit may be characterized as being a field programmable gate array. The method may further include providing a different neural network architecture for implementation in each of a plurality of machine learning devices, wherein the different neural network architectures may differ in the plurality of machine learning devices by changing a ratio of the mix of the first and second types of activation functions in the plurality of hidden layers. Assigning a combination of the activation functions may further include randomly assigning the mix of the activation functions.

FIG. 1 illustrates a plurality of type 1 activation functions. Activation functions are used in a neural network to add non-linearity to a machine learning model. An activation function can be any type of function. Activation functions may include Gaussian functions, monotonic functions (increasing or decreasing), periodic functions, trigonometric functions, and sinusoidal functions. There are various sets of activation functions that are categorized by whether the activation function has an increasing slope, a decreasing slope, or both. In this description, some commonly used activation functions are categorized by whether a plot, or graph, of the activation function has segments of increasing or decreasing slope. A type 1 activation function includes functions providing a plot having at most one increasing slope segment and/or at most one decreasing slope segment. Some examples of commonly used type 1 activation functions are illustrated in FIG. 1. In FIG. 1, five examples of activation function plots are labeled AF1-AF5. As illustrated, type 1 activation function AF1 is a hyperbolic tangent function where x is an input to a node $$\tanh(x) = \frac{e^x - e^{-x}}{e^x + e^{-x}}$$

Activation function AF2 is a sigmoid $$\sigma(x) = \frac{1}{1 + e^{-x}}$$

Activation function AF3 is a rectified linear unit (ReLU)

$$\text{ReLU}(x) = \begin{cases} 0, & x < 0 \\ x, & x \geq 0 \end{cases}$$

Activation function AF4 is a step function $$\text{Step}(x) = \begin{cases} 0, & x < 0 \\ x, & x \geq 0 \end{cases}$$

Activation function AF5 is a Gaussian function $$\text{Gaussian}(x) = e^{-x^2}$$

There are other examples of type 1 activation functions (not shown) such as a leaky ReLU function that can be used. Also, Softmax refers to a complete layer, where individual nodes in the Softmax layer have a sigmoid (type 1) activation function and the output is normalized so that the outputs sum up to 1.

Figure 2:
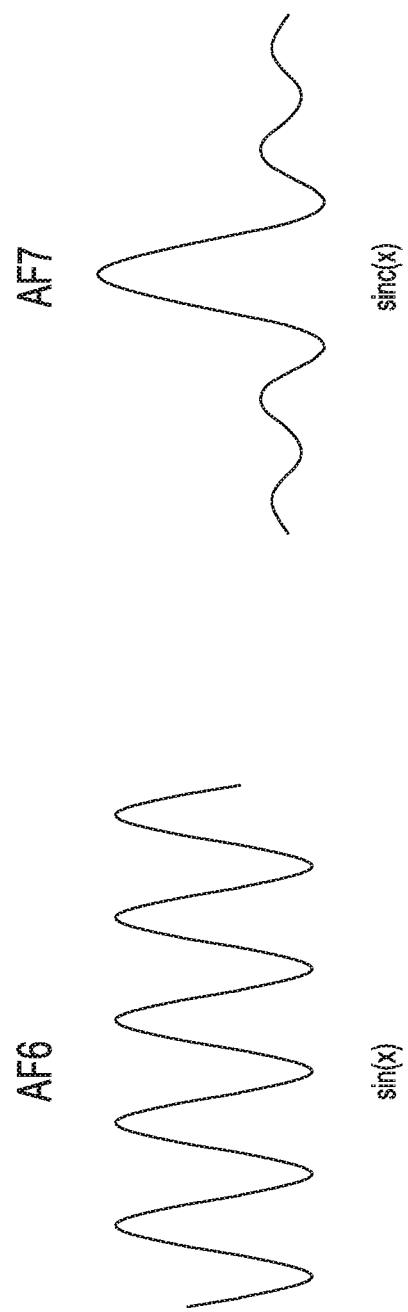
FIG. 2 illustrates a plurality of type 2 activation functions.

FIG. 2 illustrates two examples of type 2 activation functions. A type 2 activation function can be plotted having at least two increasing slope segments and/or at least two decreasing slope segments. FIG. 2 illustrates two examples of commonly used activation function plots labeled AF6 and AF7. Activation function plot AF6 is a sine function abbreviated sin(x), and activation function plot AF7 is a sine cardinal function abbreviated sinc(x).

Figure 3:
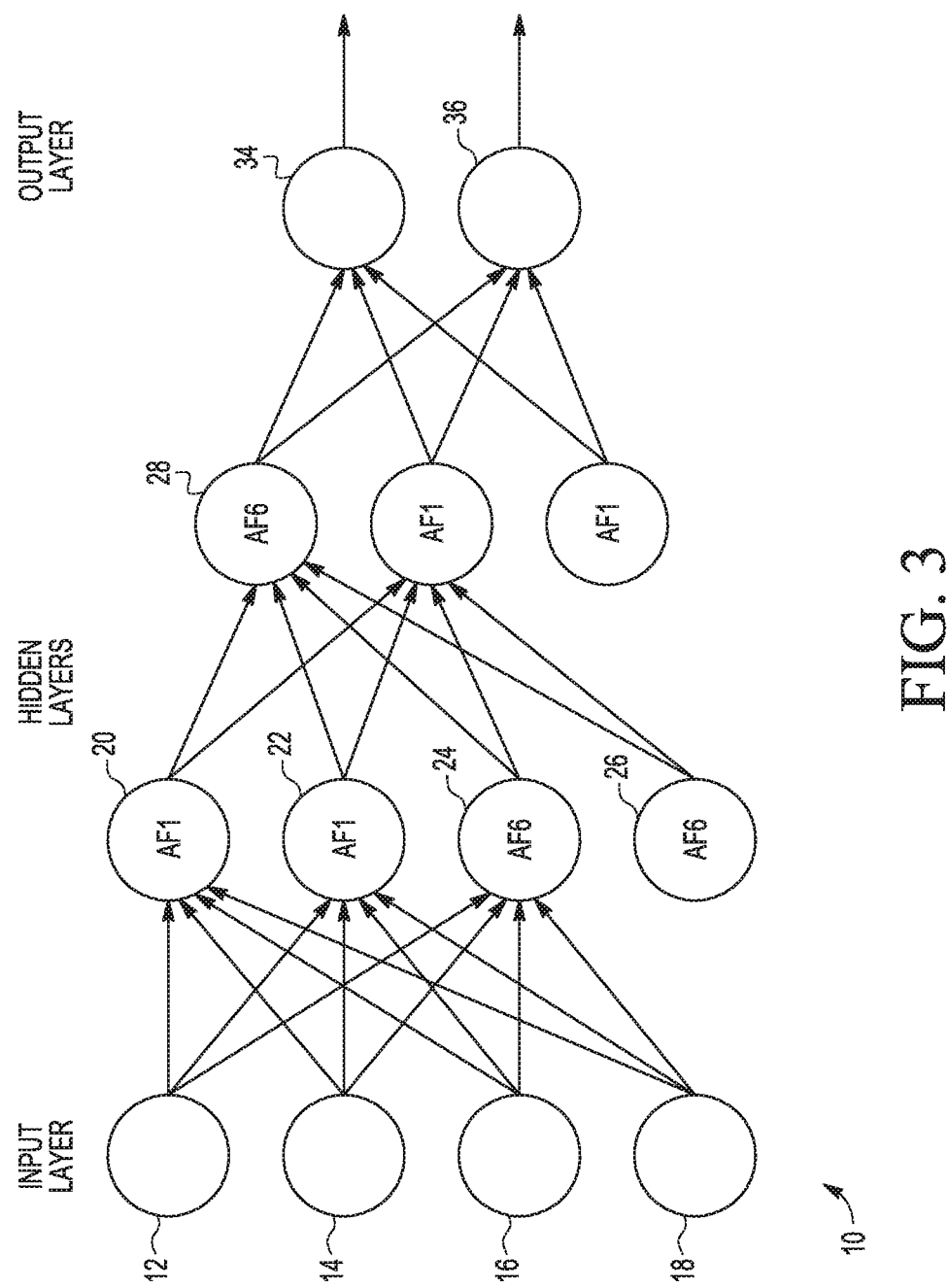
FIG. 3 illustrates a neural network architecture in accordance with an embodiment.

FIG. 3 illustrates neural network architecture 10 in accordance with an embodiment. Generally, a neural network includes an input layer, output layer, and between the input and output layers are one or more hidden layers. Each layer can have any number of nodes, or neurons. In FIG. 3, an input layer (INPUT LAYER) includes a plurality of nodes 12, 14, 16, and 18. There are two hidden layers (HIDDEN LAYERS). One hidden layer includes nodes 20, 22, 24, and 26. Another hidden layer includes nodes 28, 30, and 32. There can be any number of hidden layers. Each hidden layer can include any number of nodes. One or more output signals are computed based on a weighted sum of the inputs and output from the output nodes. An output layer (OUT- PUT LAYER) includes nodes 34 and 36. There can be any number of output nodes in the output layer. The input and output connections of the nodes are weighted. In FIG. 3, the nodes are connected by weighted arcs having arrows indicating forward propagation. However, back propagation is also possible. Also, the activation functions include non-linear activation functions. The activation functions, the weights, and the input to a node defines the output.

In accordance with an embodiment, the nodes of the hidden layers of neural network architecture 10 have a hybrid combination of activation functions. That is, the hidden layers include a combination of different types of activations functions. In accordance with an embodiment, neural network architecture 10 includes a plurality of a type 1 activation function and a plurality of a type 2 activation function. More specifically, hidden layer nodes 20, 22, 30, and 32 each have type 1 activation function AF1 (tank function) and hidden layer nodes 24, 26, and 28 each have type 2 activation function AF6 (sine function). Other combinations of activation functions can be used. In one embodiment, the activation functions are chosen and/or assigned randomly. The activation functions may be chosen to have a predetermined ratio of one activation function type to another activation function type. More specifically, the activation functions for the hidden nodes may be assigned at random and independent of the choices made for the other hidden nodes. For example, in the above example, it may be determined that the AF6 sine function comprises less than fifty percent of the total number of activation functions in the hidden layers. A neural network application is run on the neural network architecture with a training set to generate a machine learning model. As an example, one training set is the Pima-Indians-Diabetes data set, It has been determined that using a combination of activation functions for the hidden layers makes it more difficult for an attacker to make a high-quality copy of the machine learning model using access provided by an external application programming interface (API). A combination of type 1 and type 2 activation functions provides better resistance to cloning than a combination of two different type 1 activation functions. It has also been determined that the hybrid combination of activation functions, while making the model more difficult to copy, does not significantly harm the accuracy of the model. However, a model cloned from a network having a hybrid combination of activation functions does have a reduced accuracy compared to the original model.

The neural network application may be implemented in a secure hardware element to protect the neural network application from being illegitimately changed or upgraded. The secure hardware may include the neural network application implemented in hardware in a field-programmable gate array (FPGA). Using secure hardware in a device to implement the neural network also causes the combination of activation functions to be hard-coded so that the combination cannot be easily changed. For example, assume that an adversary has a device with the same neural network application as a target device. However, the target device includes a higher-quality more expensive machine learning model that the attacker would like to copy and include on the adversary's device. If the target implements the neural network application in an FPGA as described, the attacker will have difficulty upgrading to the higher-quality machine learning model of the target device. Also, the attacker will have difficulty making a copy of the model if the combination of activation functions has been implemented in the target device.

Figure 4:
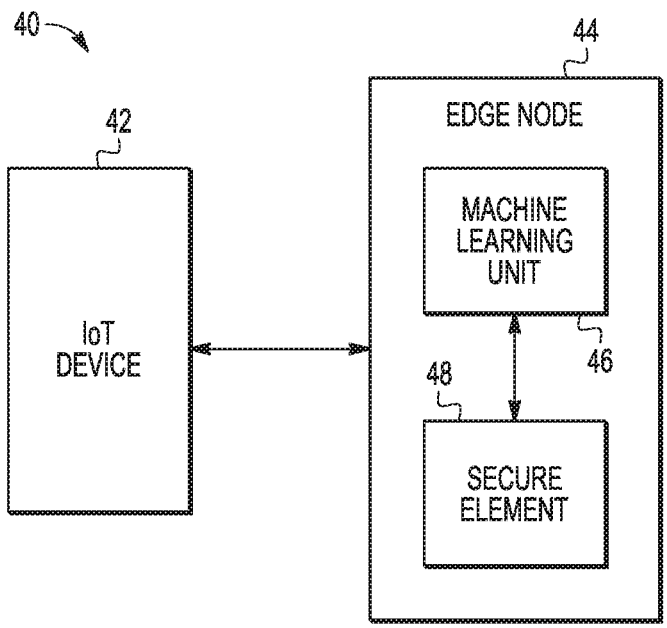
FIG. 4 illustrates an internet of things (IoT) edge node and an IoT device in accordance with an embodiment.

FIG. 4 illustrates a portion of system having Internet of things (IoT) edge node 44 and IoT device 42 in accordance with an embodiment. The IoT device 42 and edge node 44 may each be implemented on one or more integrated circuits. The IoT device 42 is bi-directionally connected to edge node 44. The IoT device 42 produces data that is sent to edge node 44. Edge node 44 includes machine learning unit 46 and secure element 48. A neural network architecture may be implemented as taught above in the presently described embodiment regarding neural network architecture 10. Secure element 48 is tamper resistant and may be used to store a neural network application such as described above. Secure element 48 may also include a processor and enough storage to store the neural network architecture including the combination of activation functions. The IoT device 42 may also have a secure element and the neural network architecture and combination of activation functions as implemented and described for edge node 44. The system may include other portions (not shown) that would be capable of implementing the machine learning unit and secure element as described.

Figure 5:
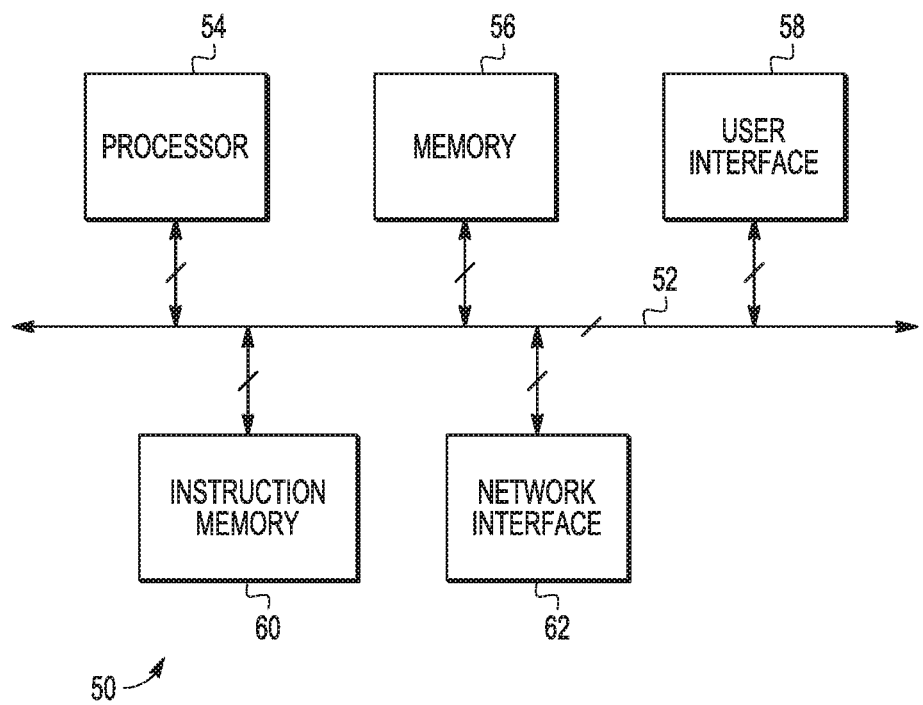
FIG. 5 illustrates an integrated circuit for use in either of the IoT edge node or IoT device in accordance with an embodiment.

FIG. 5 illustrates circuit 50 for use in either of IoT edge node 44 or IoT device 42 in accordance with an embodiment. Circuit 50 may be implemented on one or more integrated circuits and may be used to implement either or both of machine learning unit 44 and secure element 48. Circuit 50 includes bus 52. Connected to bus 52 is processor 54, memory 56, user interface 58, instruction memory 60, and network interface 62. Processor 54 may be any hardware device capable of executing instructions stored in memory 56 or instruction memory 60. Processor 54 may be, for example, a microprocessor, field programmable gate array (FPGA), application-specific integrated circuit (ASIC), or similar devices. The processor may be in the secure hardware element and may be tamper resistant.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, read only memory (ROM), or other volatile or non-volatile memory. Also, memory 56 may be in a secure hardware element.

User interface 58 may be connected to one or more devices for enabling communication with a user such as an administrator. For example, user interface 58 may be enabled for coupling to a display, a mouse, a keyboard, or other input/output device. Network interface 62 may include one or more devices for enabling communication with other hardware devices. For example, network interface 62 may include, or be coupled to, a network interface card (NIC) configured to communicate according to the Ethernet protocol. Also, network interface 62 may implement a TCP/IP stack for communication according to the TCP/IP protocols. Various other hardware or configurations for communicating are available for communicating.

Figure 6:
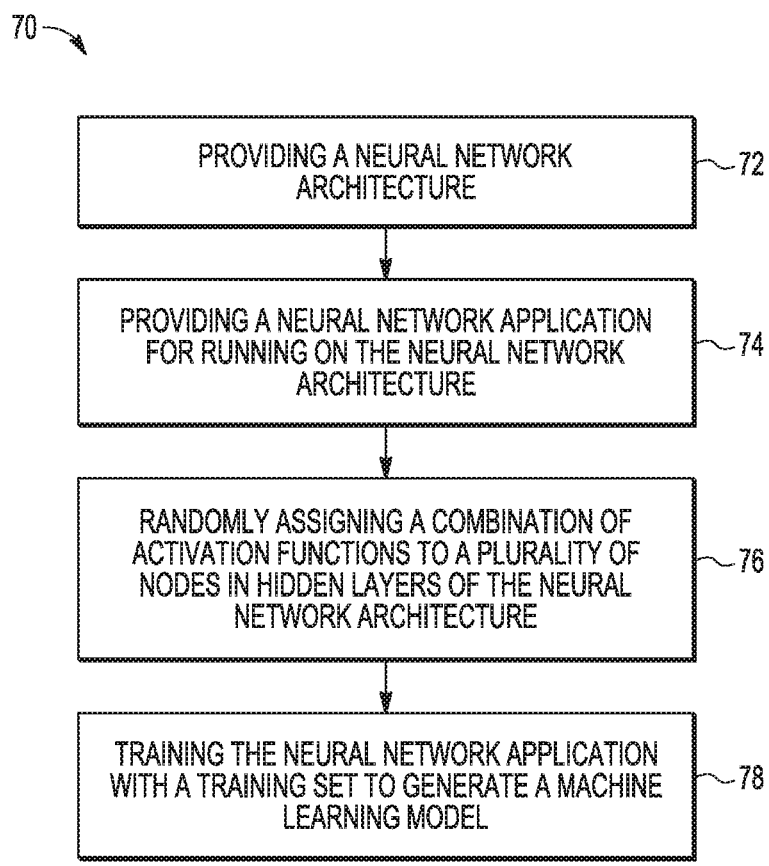
FIG. 6 illustrates a method for protecting a machine learning model from being easily copied.

Instruction memory 60 may include one or more machine-readable storage media for storing instructions for execution by processor 54. In other embodiments. memory 60 may also store data upon which processor 54 may operate. Memory 54 may store, for example, a machine learning model, or encryption, decryption, or verification applications. Memory 60 may be in the secure hardware element and be tamper resistant, FIG. 6 illustrates method 70 for protecting a machine learning model from copying. Method 70 begins at step 72, where a neural network architecture is provided. At step 74, a neural network application for running on the neural network architecture is provided. At step 76, a combination of different types of activation functions is assigned to a plurality of nodes in the hidden layers of the neural network architecture. In one embodiment, the combination of activation functions is randomly assigned to plurality of nodes of the hidden layers. At step 78, the neural network application is trained with a training set to generate a machine learning model. The use of the combination of activation functions protects the machine learning model for copying.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   providing a neural network architecture having an input layer, a plurality of hidden layers, and an output layer, each of the plurality of hidden layers having a plurality of nodes;
   providing a neural network application to run on the neural network architecture;
   providing a first type of activation functions;
   providing a second type of activation functions, wherein the second type of activation functions is different from the first type of activation functions;
   assigning a combination of the activation functions of the first and second types to the plurality of nodes; and
   training the neural network application with a training set to generate a machine learning model.

2. The method of claim 1, wherein the neural network application is implemented in a secure hardware element on an integrated circuit.

3. The method of claim 2, wherein the integrated circuit is characterized as being a field programmable gate array.

4. The method of claim 2, further comprising providing a different neural network architecture for implementation in each of a plurality of machine learning devices, wherein the different neural network architectures differ in the plurality of machine learning devices by changing a ratio of the combination of the first and second types of activation functions in the plurality of hidden layers.

5. The method of claim 1, wherein the activation function of the first type includes functions providing a plot having at most one increasing slope segment and/or at most one decreasing slope segment.

6. The method of claim 1, wherein the activation function of the second type includes functions providing a plot having at least two increasing slope segments and/or at least two decreasing slope segments.

7. The method of claim 1, wherein assigning a combination of the activation functions further comprises randomly assigning the mix of the activation functions.

8. The method of claim 1, wherein the combination of activation functions is implemented in a secure hardware element in the integrated circuit with the neural network application and wherein the neural network application is not changeable.

9. The method of claim 1, wherein the assigning the combination of activation functions further comprises the first and second types of the activation functions being assigned from a set of activation functions comprising tanh(x), rectified linear unit ReLU(x), step(x), Gaussian(x), sigmoid(x) sin(x), and sinc(x), wherein x is an input to a node of the plurality of nodes.

10. The method of claim 1, wherein assigning a combination of the activation functions of the first and second types to the plurality of nodes further comprises assigning a sine function as one of the activation functions of the first or the second types, and wherein fewer than fifty percent of the plurality of nodes comprises the sine function.

11. The method of claim 1, wherein the activation function of the second type is a sinusoid, and the activation function of the first type is a monotone.

12. A method for protecting a machine learning model from copying, the method comprising:
   providing a neural network architecture having an input layer, a plurality of hidden layers, and an output layer, each of the plurality of hidden layers having a plurality of nodes;
   providing a neural network application to run on the neural network architecture;
   providing a first type of activation function;
   providing a second type of activation function, wherein the second type of activation functions is different from the first type of activation functions;
   randomly assigning a combination of the activation functions of the first and second types to the plurality of nodes; and
   training the neural network application with a training set to generate a machine learning model, wherein the combination of the first and second types of the activation functions causes the machine learning model to be more difficult to copy.

13. The method of claim 12, wherein the neural network application is implemented in a secure hardware element on an integrated circuit.

14. The method of claim 13, wherein the integrated circuit is characterized as being a field programmable gate array.

15. The method of claim 13, further comprising providing a different neural network architecture for implementation in each of a plurality of machine learning devices, wherein the different neural network architectures differ in the plurality of machine learning devices by changing a ratio of the mix of the first and second types of activation functions in the plurality of hidden layers.

16. The method of claim 12, wherein assigning a combination of the activation functions further comprises randomly assigning the mix of the activation functions.

17. The method of claim 12, wherein the combination of activation functions is implemented in a secure hardware element in the integrated circuit with the neural network application and wherein the neural network application is not changeable.

18. The method of claim 12, wherein the assigning the combination of activation functions further comprises the first and second types of the activation functions being assigned from a set of activation functions comprising tanh(x), rectified linear unit ReLU(x), step(x), Gaussian(x), sin(x), and sinc(x), wherein x is an input to a node of the plurality of nodes.

19. A method for protecting a machine learning model from copying, the method comprising:
providing a neural network architecture having an input layer, a plurality of hidden layers, and an output layer, each of the plurality of hidden layers having a plurality of nodes;
providing a neural network application to run on the neural network architecture, the neural network application implemented in a secure hardware element of an integrated circuit;
providing a first type of activation function comprising activation functions that are plotted with no more than one increasing slope segment or no more than one decreasing slope segment;
providing a second type of activation function comprising activation functions that are plotted with at least two increasing slope segments and at least two decreasing slope segments;
assigning a combination of the activation functions of the first and second types to the plurality of nodes; and
training the neural network application with a training set to generate a machine learning model, wherein the mix of the first and second types of the activation functions cause the machine learning model to be more difficult to copy.

20. The method of claim 19, wherein the integrated circuit is characterized as being a field programmable gate array.

21. The method of claim 19, further comprising providing a different neural network architecture for implementation in each of a plurality of machine learning devices, wherein the different neural network architectures differ in the plurality of machine learning devices by changing a ratio of the mix of the first and second types of activation functions in the plurality of hidden layers.

22. The method of claim 19, wherein assigning a combination of the activation functions further comprises randomly assigning the mix of the activation functions.

* * * * *